United States Patent Office 3,618,444
Patented Nov. 9, 1971

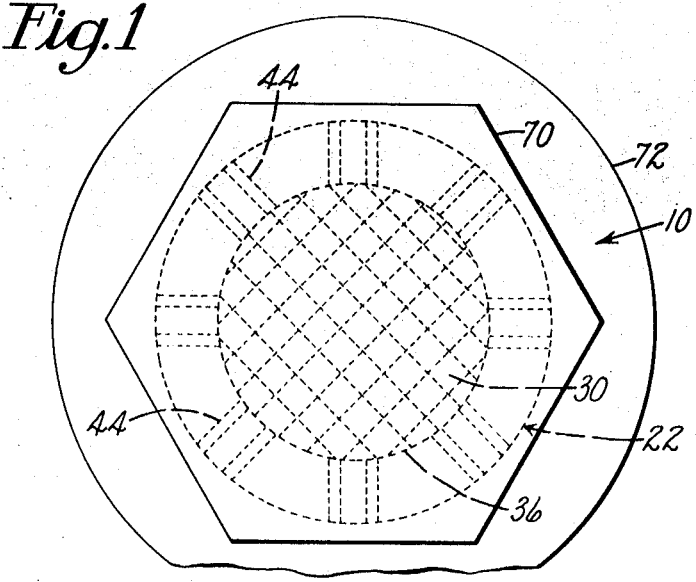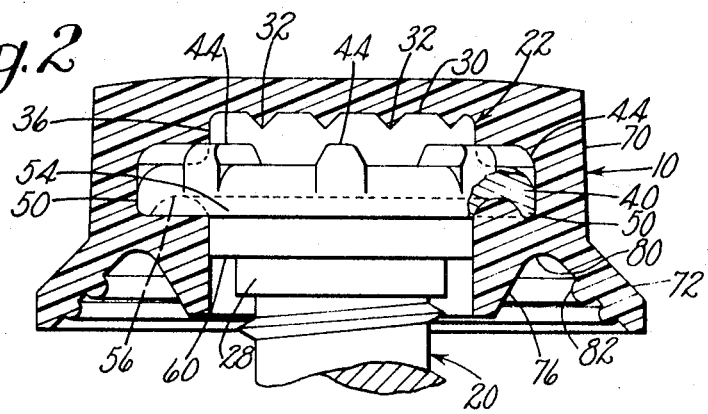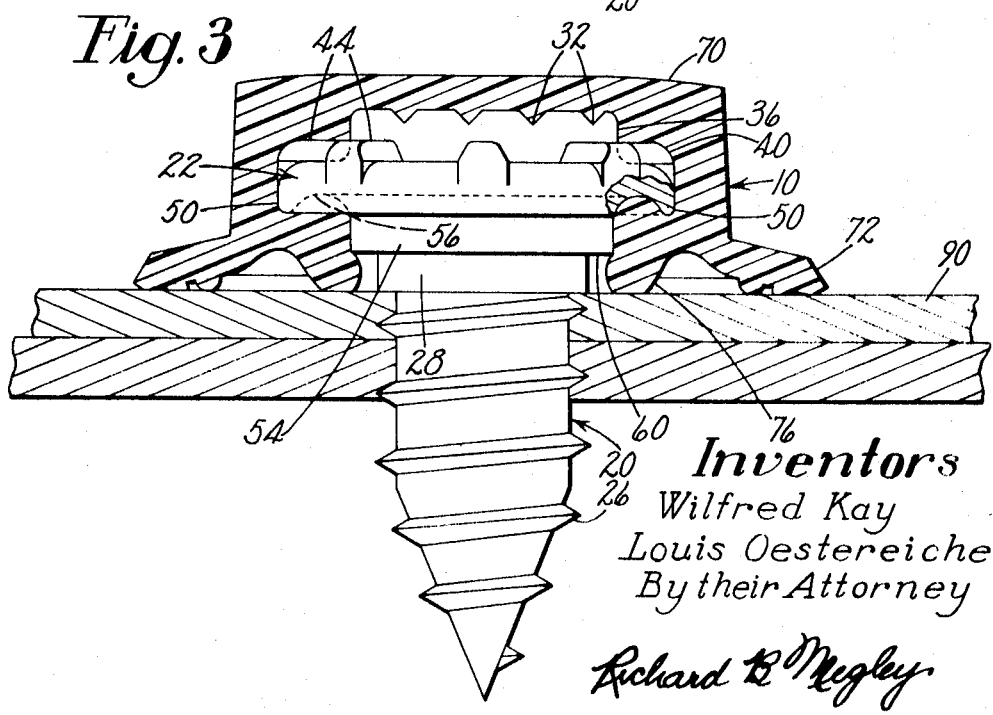

3,618,444
CORROSION RESISTANT FASTENERS
Wilfred Kay, West Caldwell, and Louis Oestereicher, Teaneck, N.J., assignors to USM Corporation, Boston, Mass.
Filed May 16, 1969, Ser. No. 825,335
Int. Cl. F16b 23/00
U.S. Cl. 85—9
4 Claims

ABSTRACT OF THE DISCLOSURE

A corrosion resistant fastener comprising a metallic portion having a threaded shaft and a retaining head. A plastic head is retained securely in position on the metallic portion by flanged retaining means associated with the metallic retaining head. The plastic head has a skirt which is urged into weather sealing engagement with the surface of a member into which the fastener is inserted, by the metallic retaining head.

BACKGROUND OF THE INVENTION

This invention relates to a corrosion resistant threaded fastener and, more particularly, to a metal screw having a plastic head.

Corrosion or weather resistant threaded fasteners are utilized primarily in the building construction field. The heads of fasteners used to secure building panels and the like are continuously subjected to the corrosive influences of the atmosphere. Apart from the use of exotic or costly metals in the manufacture of these fasteners, the only real advance in the art has been the use of plastic heads on a threaded metallic member. The plastic head which is molded onto the threaded member is normally provided with a skirt or flange which engages the structure into which the fastener is inserted. This plastic skirt or flange is intended to provide a seal to prevent moisture from contacting the metal portion of the fastener.

The outstanding deficiency of the plastic headed fasteners taught by the prior art has been their propensity to "bottle cap" off the metallic member upon the application of pressure to the skirt or depending portion of the plastic head. That is, all of the prior art disclosures fail to teach means for securely retaining the plastic head in position during insertion of the fastener. Successful use of this type of fastener dictates that pressure be exerted upon the depending portion or skirt by the surface of the member into which the fastener is inserted to obtain the desired weather seal. The engagement of the depending portion or skirt with the structure into which the fastener is inserted effects the seal. In order to ensure a weather-tight seal complete circumferential engagement is required. This can only be accomplished or ensured by the application of substantial force translated through the skirt during insertion. It is therefore common for the present commercially available plastic headed fasteners to lose their heads during the final phase of insertion due to the lack of adequate retaining means.

The consistency with which presently available plastic headed fasteners are capable of attaining a weather-proof seal is considerably less than acceptable. None of the prior art disclosures provides or teaches positive means for urging the skirt or depending portion into intimate contact with the member into which the fastener is inserted. That is, no means are provided other than the translation of forces through the skirt itself during insertion. When an irregular surface is encountered, the available plastic headed fasteners have been found lacking. They are incapable of consistently providing a weather-proof seal.

The features of this invention, together with the various novel details of construction, will now be more particularly described with reference to the accompanying drawings and pointed out in the claims. It is to be understood that the particular embodiment of the invention shown in the drawings is for illustration purposes only and is not to be construed as a limitation of the invention. It is to be further understood that this invention is applicable to any fastener to be employed where a weather-proof seal is desired including bolts, screws and the like.

DESCRIPTION OF THE DRAWINGS

FIG. 1 is an end view of a plastic head and metallic fastener portion;

FIG. 2 is a fragmentary side view, partly in section, of a fastener constructed in accordance with this invention; and FIG. 3 is a side view, partly in section, illustrating a screw constructed in accordance with this invention in an inserted position.

DESCRIPTION OF THE PREFERRED EMBODIMENT

A fastener constructed in accordance with the preferred embodiment of this invention comprises a plastic sealing head 10 and a threaded metallic shaft 20 having a metallic retaining head 22. The preferred embodiment to be described with reference to FIGS. 1 to 3 utilizes the features of this invention on a screw.

The threaded metallic shaft 20 has a conventional helical thread 26 carried thereon. The thread 26 preferably extends the full length of the shaft 20 and terminates at a lower shoulder 28 of the retaining head 22. The shaft 20 may be provided with a double lead thread, if desired, to facilitate proper alinement of the screw in a hole into which it is to be inserted.

The retaining head 22 is integral with the threaded shaft 20 and has a maximum diameter greater than that of the shaft 20. As best illustrated in FIG. 1, the upper generally circular surface 30 of the retaining head 22 is knurled. A plurality of grooves 32 formed by the knurling operation cooperate with other means to be hereafter described to retain the plastic sealing head 10 in location on the retaining head 22. That is, as will be hereafter discussed in detail, the series of grooves 32 provide frictional and mecahnical forces which tend to retain a plastic head molded onto the retaining head in a fixed location.

The knurled surface 30 is formed on the upper surface of an essentially cylindrical portion 36 of the retaining head 22 which extends outwardly from a main body portion 40 (see FIGS. 2 and 3). The main body portion 40 of the retaining head 22 is of greater diameter than the cylindrical portion 36 and substantially greater diameter than the shaft 20. A plurality of radial arms 44 extend outwardly from the cylindrical portion 36 on the upper surface of the main body portion 40 of the retaining head 22. The radial arms 44 are integral with the main body portion and extend outwardly or upwardly therefrom whereby to provide retaining means for the plastic head 10. The radial arms are particularly important with regard to the absorption of the circumferential forces or torque applied by a wrench used to insert the fastener.

The lower or underside of the main body portion 40 has an annular depending portion or flange 50 extending downwardly or shaftwardly therefrom along the outer circumference thereof. The flange 50 and an upper shoulder 54 form a relatively deep dished portion or annular groove 56 in which plastic material is entrapped when a plastic head 10 is molded on the retaining head 22. As will be discussed, when the fastener is inserted the annular groove 56 provides retaining forces on the plastic head 22.

The plastic head 10 is molded in situ on the metallic retaining head 22 described above. The outer circumferential surface of the lower shoulder 28 and the lower annular portion or surface 60 of the shoulder 54 which extends radially outwardly beyond the shoulder 28 serve as sealing surfaces or abutments for an injection die during an injection molding operation which affixes the plastic head 10 to the retaining head 22.

The plastic sealing head 10 comprises an upstanding torquing portion 70 and an outer skirt 72 depending outwardly and downwardly therefrom. The circumferential outline of the torquing portion 70 may be of any convenient configuration, preferably hexagonal as illustrated in FIG. 1, capable of cooperating with a standard wrench to facilitate insertion of the fastener or screw. The skirt 72 flares outwardly from the lower end of the torquing portion 70 and depends beyond the lower surface of the shoulder 28 whereby it is in location to engage the surface of a member into which the screw is inserted. In the preferred embodiment shown particularly in FIGS. 2 and 3, the sealing head 10 is also provided with an inner skirt 76 molded into engagement with the outer, circumferential surface of the upper shoulder 54. The inner cylindrical surface of the skirt 76 extends downwardly from the outer, circumferential surface of the upper shoulder 54 in alinement therewith and concentric with the outer, circumferential surface of the shoulder 28. The inner skirt 76 depends slightly below the shoulder 28.

As clearly shown in FIG. 2, the described preferred construction of the sealing head 10 provides a relatively deep annular groove 80 having an inverted conical cross sectional profile on the underside of the sealing head 10. The depending skirts 72 and 76 provide relatively flexible sealing members capable of ensuring consistent weathertight seals as will be described.

When the sealing head 10 is injection molded onto the retaining head 10, plasitc material is deposited in the grooves 32, around the radial arms 44, and in the annular pocket or groove 56 formed between the flange 50 and upper shoulder 54. The sealing head 10 thus comprises a unitary mass of plastic material held securely in position by the construction of the retaining head 22. While any commercially available plastic material having an adequate impact resistance and modulus of elasticity may be employed, preferred plastic materials include polycarbonate and polymethylene resins and polyamide.

In the preferred illustrated embodiment, a plurality of annular projections or ribs 82 are formed on the underside of the outer skirt 72. These circumferential ribs 82 engage the surface of a member into which the screw is inserted and thereby increase the integrity of the seal.

If preferred, the inner skirt 76 may be eliminated and the underside of the skirt 72 joined or blended directly into engagement with the shoulder 54 or shoulder 28.

An appreciation of the outstanding, consistent performance and sealing ability of the screw can best be obtained by a description of the insertion operation. The illustrated screw may be conveniently inserted by the application of torque on the torquing portion 70 by a conventional wrenching tool. The intimate engagement and locking relationship between the unitary plastic sealing head and the groves 32 and radial arms 44 effects the translation of torque applied to the plastic head 10 to the threaded shaft 20 without any relative movement between the plastic head 10 and the metallic retaining head 22.

During the final phase of the insertion operation, the depending skirt 72 engages the surface 90 of the member into which the screw is being inserted. It is during this period that the fasteners of the prior art have experienced a high incidence of failure. The plastic head 10 is transformed from the relaxed or unstressed configuration shown in FIG. 2 to the highly stressed configuration shown in FIG. 3. In the fully seated position, the surface 90 is in contact with the lower shoulder 28. The initial engagement of the flange 72 with the surface 90 results in forces tending to urge or "bottle cap" the sealing head 10 off the retaining head 22. These forces are steadily magnified as the insertion operation continues to its climax when the screw and sealing head 10 thereon are seated in the position shown in FIG. 3. As can be clearly seen from FIG. 3, these forces apply a direct, positive vector force tending to remove the head 10. The flange 50 on the retaining head 22 prevents such removal.

The plastic material of the unitary sealing head 10 entrapped in the groove 56 between the flange 50 and the shoulder 54 is securely retained in position by the depending flange 50. This construction has been found to obviate the "bottle capping" problem which plagued all of the prior art disclosures. The retaining forces exerted by the flange 50 are sufficient to overcome forces translated through the skirts 72 and 76 during insertion.

A further benefit derived from the construction and location of the depending flange 50 is the application of positive, uniform sealing pressure along the circumference of the outer skirt 72 and on the inner skirt 76. That is, the flange 50 applies forces directly through the skirts 72 to the surface 90 during the final phase of the insertion process. These forces are applied around the entire skirt 72 circumference by the annular flange 50. As a consequence, intimate continuous sealing contact is ensured between the skirt 72 and the surface 90.

As stated above, the skirt 76 depends slightly below the lower shoulder 28 of the retaining head 22. The skirt 76 does not extend downwardly or shaftwardly as great a distance as the skirt 72. Accordingly, the skirt 76 will engage the surface 90 subsequent to its engagement by the skirt 72. The inverted conical cross-sectional profile of the groove 56 provides the skirt 76 with an outer side wall which will be angularly disposed relative to a surface, e.g. 90, of a member into which the screw is inserted and relative to said shaft 20. As a result, the skirt or lower portion thereof will be urged into a position under the surface 60 of the upper shoulder 54 when the screw and plastic head 10 are fully seated. Thus, further sealing is provided for the metallic members of the screw. This construction results in positive forces being applied by the flange 50 through the inner skirt 76.

In the use of the preferred embodiment, the annular ribs 82 are urged into engagement with the surface 90 by the flange 50 in like manner as the remainder of the flange 72. The ribs 82 provide additional areas for surface engagement or sealing as discussed above.

Having thus described by invention, what I claim as new and desire to secure by Letters Patent of the United States is:

1. A headed, externally threaded fastener having a corrosion resistant head construction sealable against a receiving member comprising: a metal shaft having an external thread thereon; a metal retaining head integral with said shaft and comprising a main body portion of substantially greater diameter than said shaft, a retaining flange depending shaftwardly from said main body portion substantially along the outer circumference of said main body portion, and a lower shoulder of lesser diameter than said main body portion formed on the underside thereof and adapted to seat against said receiving member, and an enlarged upper shoulder between the flange and said lower shoulder whereby an annular groove is formed between said retaining flange and the upper shoulder of said main body portion; and a unitary plastic sealing head molded on said retaining head comprising a torquing portion adapted to be engaged by wrenching tool, said head having a depending first skirt flaring outwardly from said torquing portion and depending shaftwardly below said retaining head, a second inner skirt depending in concentricity with said shaft and in substantial engagement with the outer circumference of said upper shoulder and a retaining portion of said unitary plastic head being disposed in said annular groove formed between said retaining flange and said upper shoulder whereby said plastic head is securely retained on said retaining head during the insertion of the said fastener into said receiving member, said fastener insertion being limited by said lower shoulder.

2. A headed, externally threaded fastener according to claim 1 wherein said second skirt extending shaftwardly a lesser distance than said first skirt.

3. A headed, externally threaded fastener according to claim 2 wherein said second skirt has an outer side wall angularly disposed relative to said shaft whereby said second skirt is urged toward said shaft upon engagement with the surface of a member into which the fastener is inserted.

4. A headed, externally threaded fastener according to claim 2 wherein the underside of said first skirt has a plurality of annular ribs formed thereon.

References Cited

UNITED STATES PATENTS

| 2,439,516 | 4/1948 | Holcomb | 85—1 P |
| 2,795,144 | 6/1957 | Morse | 85—1 JP |
| 2,850,064 | 9/1958 | Rapata | 85—1 JP |
| 2,983,534 | 5/1961 | Heller et al. | 85—1 JP |
| 3,134,290 | 5/1964 | Jentoft | 85—54 |
| 3,191,730 | 6/1965 | Fischer | 85—50 |

FOREIGN PATENTS

| 690,269 | 4/1953 | Great British | 85—1 JP |
| 883,340 | 11/1961 | Great Britain | 85—1 JP |
| 929,176 | 6/1963 | Great Britain | 85—1 JP |
| 993,021 | 5/1965 | Great Britain | 85—1 JP |

MARION PARSONS, JR., Primary Examiner

U.S. Cl. X.R.

85—54